(12) United States Patent
Cook et al.

(10) Patent No.: US 11,436,002 B2
(45) Date of Patent: *Sep. 6, 2022

(54) SYSTEMS AND METHODS FOR FAILSAFE FIRMWARE UPGRADES

(71) Applicant: CalAmp Corp., Irvine, CA (US)

(72) Inventors: Russell Cook, Irvine, CA (US); Somasundaram Ramiah, Irvine, CA (US)

(73) Assignee: CalAmpCorp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,703

(22) Filed: Mar. 23, 2020

(65) Prior Publication Data

US 2020/0394034 A1 Dec. 17, 2020

Related U.S. Application Data

(63) Continuation of application No. 15/833,350, filed on Dec. 6, 2017, now Pat. No. 10,599,421.

(Continued)

(51) Int. Cl.
*G06F 8/654* (2018.01)
*G06F 9/4401* (2018.01)
(Continued)

(52) U.S. Cl.
CPC ............ *G06F 8/654* (2018.02); *G06F 9/4401* (2013.01); *G06F 16/2365* (2019.01); *G06F 8/63* (2013.01)

(58) Field of Classification Search
CPC .... G06F 8/654; G06F 16/2365; G06F 9/4401; G06F 8/63
See application file for complete search history.

(56) References Cited

U.S. PATENT DOCUMENTS

| 4,497,025 A | 1/1985 | Hannoyer |
| 4,549,277 A | 10/1985 | Brunson et al. |

(Continued)

FOREIGN PATENT DOCUMENTS

| EP | 2056298 A1 | 5/2009 |
| EP | 2083276 A1 | 7/2009 |

(Continued)

OTHER PUBLICATIONS

Nilsson et al, "A Framework for Self-Verification of Firmware Updates over the Air in Vehicle ECUs", [Online], 2008, pp. 1-5, [Retrieved from internet on Apr. 19, 2022], <https://ieeexplore.ieee.org/stamp/stamp.jsp?tp=&arnumber=4746641> (Year: 2008).*

(Continued)

*Primary Examiner* — S. Sough
*Assistant Examiner* — Zengpu Wei
(74) *Attorney, Agent, or Firm* — Barnes & Thornburg LLP

(57) ABSTRACT

Systems and methods for failsafe firmware upgrades in accordance with embodiments of the invention are disclosed. One embodiment includes a vehicle telematics device, including: a processor; and a firmware memory comprising a firmware image coupled to the processor, wherein the firmware image further comprise a first segment and a second segment; wherein a primary bootloader application located in the firmware image: verifies the integrity of the first segment; verifies the integrity of the second segment; selects a firmware image contained in the firmware memory using a failsafe process; and—boots the vehicle telematics device using the selected firmware image.

13 Claims, 6 Drawing Sheets

Related U.S. Application Data

(60) Provisional application No. 62/532,834, filed on Jul. 14, 2017.

(51) Int. Cl.
*G06F 16/23* (2019.01)
*G06F 8/61* (2018.01)

(56) References Cited

U.S. PATENT DOCUMENTS

| | | | |
|---|---|---|---|
| 5,058,020 A | 10/1991 | Matsuda |
| 5,117,375 A | 5/1992 | Worcester et al. |
| 5,251,161 A | 10/1993 | Gioutsos et al. |
| 5,253,173 A | 10/1993 | Drobny et al. |
| 5,337,238 A | 8/1994 | Gioutsos et al. |
| 5,339,242 A | 8/1994 | Reid et al. |
| 5,377,108 A | 12/1994 | Nishio |
| 5,519,613 A | 5/1996 | Gioutsos et al. |
| 5,559,699 A | 9/1996 | Gioutsos |
| 5,563,791 A | 10/1996 | Gioutsos et al. |
| 5,587,906 A | 12/1996 | McIver et al. |
| 5,588,005 A | 12/1996 | Ali et al. |
| 5,684,701 A | 11/1997 | Breed |
| 5,754,115 A | 5/1998 | Woo |
| 5,758,301 A | 5/1998 | Saito et al. |
| 5,767,766 A | 6/1998 | Kwun |
| 5,780,782 A | 7/1998 | O'Dea |
| 5,805,460 A | 9/1998 | Greene et al. |
| 5,825,283 A | 10/1998 | Camhi |
| 5,841,201 A | 11/1998 | Tabata et al. |
| 5,862,511 A | 1/1999 | Croyle et al. |
| 5,874,675 A | 2/1999 | Edmans et al. |
| 5,978,722 A | 11/1999 | Takasuka et al. |
| 6,029,111 A | 2/2000 | Croyle |
| 6,076,028 A | 6/2000 | Donnelly et al. |
| 6,085,151 A | 7/2000 | Farmer et al. |
| 6,163,690 A | 12/2000 | Lilja |
| 6,236,921 B1 | 5/2001 | McConnell |
| 6,269,290 B1 | 7/2001 | Egami et al. |
| 6,308,134 B1 | 10/2001 | Croyle et al. |
| 6,337,653 B1 | 1/2002 | Buchler et al. |
| 6,346,876 B1 | 2/2002 | Flick |
| 6,356,841 B1 | 3/2002 | Hamrick et al. |
| 6,363,308 B1 | 3/2002 | Caruso et al. |
| 6,392,527 B1 | 5/2002 | Gilano et al. |
| 6,401,027 B1 | 6/2002 | Xu et al. |
| 6,417,802 B1 | 7/2002 | Diesel |
| 6,431,593 B1 | 8/2002 | Cooper et al. |
| 6,438,475 B1 | 8/2002 | Gioutsos et al. |
| 6,532,419 B1 | 3/2003 | Begin et al. |
| 6,540,255 B1 | 4/2003 | Blank et al. |
| 6,611,755 B1 | 8/2003 | Coffee et al. |
| 6,737,989 B2 | 5/2004 | Flick |
| 6,756,885 B1 | 6/2004 | Flick |
| 6,812,888 B2 | 11/2004 | Drury et al. |
| 6,832,140 B2 | 12/2004 | Fan et al. |
| 6,912,557 B1 | 6/2005 | North et al. |
| 7,015,830 B2 | 3/2006 | Flick |
| 7,020,501 B1 | 3/2006 | Elliott et al. |
| 7,050,897 B2 | 5/2006 | Breed et al. |
| 7,085,637 B2 | 8/2006 | Breed et al. |
| 7,110,880 B2 | 9/2006 | Breed et al. |
| 7,158,016 B2 | 1/2007 | Cuddihy et al. |
| 7,250,850 B2 | 7/2007 | Mizutani |
| 7,272,493 B1 | 9/2007 | Hamrick et al. |
| 7,286,929 B2 | 10/2007 | Staton et al. |
| 7,348,895 B2 | 3/2008 | Lagassey |
| 7,366,608 B2 | 4/2008 | Hamrick et al. |
| 7,460,954 B2 | 12/2008 | Hamrick et al. |
| 7,484,756 B2 | 2/2009 | Le et al. |
| 7,527,288 B2 | 5/2009 | Breed |
| 7,577,525 B2 | 8/2009 | Hamrick et al. |
| 7,607,510 B1 | 10/2009 | Mun |
| 7,643,919 B2 | 1/2010 | Nicaise |
| 7,671,727 B2 | 3/2010 | Flick |
| 7,725,218 B2 | 5/2010 | Hamrick et al. |
| 7,765,039 B1 | 7/2010 | Hagenbuch |
| 7,767,766 B2 | 8/2010 | Tilbrook |
| 7,805,231 B2 | 9/2010 | Cluff et al. |
| 7,805,276 B1 | 9/2010 | Byers et al. |
| 8,004,397 B2 | 8/2011 | Forrest et al. |
| 8,010,251 B2 | 8/2011 | Hamrick et al. |
| 8,032,278 B2 | 10/2011 | Flick |
| 8,155,841 B2 | 4/2012 | Erb |
| 8,330,626 B1 | 12/2012 | Adelson |
| 8,489,271 B2 | 7/2013 | Hergesheimer et al. |
| 8,688,380 B2 | 4/2014 | Cawse et al. |
| 8,749,350 B2 | 6/2014 | Geisler et al. |
| 8,762,009 B2 | 6/2014 | Ehrman et al. |
| 8,799,034 B1 | 8/2014 | Brandmaier et al. |
| 8,812,173 B2 | 8/2014 | Chen et al. |
| 8,868,796 B1* | 10/2014 | Wojcik ............... G06F 8/65 710/8 |
| 8,874,279 B2 | 10/2014 | Frye et al. |
| 8,893,114 B1 | 11/2014 | Cooley |
| 8,996,340 B2 | 3/2015 | Cheriere et al. |
| 9,002,538 B2 | 4/2015 | Hergesheimer et al. |
| 9,171,460 B2 | 10/2015 | Chen et al. |
| 9,179,497 B1 | 11/2015 | McConnell et al. |
| 9,217,757 B2 | 12/2015 | Hergesheimer et al. |
| 9,392,431 B2 | 7/2016 | Barfield, Jr. et al. |
| 9,406,222 B2 | 8/2016 | Hergesheimer et al. |
| 9,457,754 B1 | 10/2016 | Christensen et al. |
| 9,459,277 B2 | 10/2016 | Hergesheimer et al. |
| 9,491,420 B2 | 11/2016 | Mimar |
| 9,644,977 B2 | 5/2017 | Camisa |
| 9,648,579 B2 | 5/2017 | Abhishek |
| 9,650,007 B1 | 5/2017 | Snyder et al. |
| 10,005,909 B2 | 6/2018 | Endert et al. |
| 10,102,689 B2 | 10/2018 | Hergesheimer et al. |
| 10,107,831 B2 | 10/2018 | Hergesheimer et al. |
| 10,185,513 B1* | 1/2019 | Vandewater ......... G06F 3/0679 |
| 10,304,264 B2 | 5/2019 | Camisa |
| 2002/0013648 A1 | 1/2002 | Feser et al. |
| 2002/0065045 A1 | 5/2002 | Kim |
| 2002/0100310 A1 | 8/2002 | Begin |
| 2002/0124166 A1 | 9/2002 | Lee et al. |
| 2002/0135167 A1 | 9/2002 | Mattes et al. |
| 2002/0188940 A1 | 12/2002 | Breckner et al. |
| 2003/0001368 A1 | 1/2003 | Breed et al. |
| 2003/0028766 A1 | 2/2003 | Gass et al. |
| 2003/0151507 A1 | 8/2003 | Andre et al. |
| 2003/0176959 A1 | 9/2003 | Breed |
| 2003/0236970 A1 | 12/2003 | Palmer et al. |
| 2004/0036261 A1 | 2/2004 | Breed |
| 2004/0075539 A1 | 4/2004 | Savoie et al. |
| 2004/0088090 A1 | 5/2004 | Wee |
| 2004/0132500 A1 | 7/2004 | Rogalski et al. |
| 2004/0142659 A1 | 7/2004 | Oesterling |
| 2004/0155790 A1 | 8/2004 | Tsuji |
| 2004/0171378 A1 | 9/2004 | Rautila |
| 2004/0257208 A1 | 12/2004 | Huang et al. |
| 2005/0065711 A1 | 3/2005 | Dahlgren et al. |
| 2005/0099289 A1 | 5/2005 | Arita et al. |
| 2005/0240343 A1 | 10/2005 | Schmidt et al. |
| 2005/0283286 A1 | 12/2005 | Kanda et al. |
| 2006/0022469 A1 | 2/2006 | Syed et al. |
| 2006/0041336 A1 | 2/2006 | Schubert et al. |
| 2006/0047459 A1 | 3/2006 | Underbrink et al. |
| 2006/0050953 A1 | 3/2006 | Farmer et al. |
| 2006/0199537 A1 | 9/2006 | Eisenbach |
| 2007/0027612 A1 | 2/2007 | Barfoot et al. |
| 2007/0109117 A1 | 5/2007 | Heitzmann et al. |
| 2007/0229251 A1 | 10/2007 | Ehrman et al. |
| 2007/0257791 A1 | 11/2007 | Arita et al. |
| 2007/0266078 A1 | 11/2007 | Rittle et al. |
| 2007/0271014 A1 | 11/2007 | Breed |
| 2007/0299587 A1 | 12/2007 | Breed et al. |
| 2008/0111666 A1 | 5/2008 | Plante et al. |
| 2008/0114545 A1 | 5/2008 | Takaoka et al. |
| 2008/0126788 A1* | 5/2008 | Kreek .................. G06F 9/4411 713/100 |
| 2008/0128600 A1 | 6/2008 | Ogisu et al. |
| 2008/0150707 A1 | 6/2008 | Shamoto |

(56) References Cited

U.S. PATENT DOCUMENTS

| | | |
|---|---|---|
| 2008/0195261 A1 | 8/2008 | Breed |
| 2008/0202199 A1 | 8/2008 | Finley et al. |
| 2008/0211666 A1 | 9/2008 | Saidi et al. |
| 2008/0211914 A1 | 9/2008 | Herrera et al. |
| 2008/0275601 A1 | 11/2008 | Saito et al. |
| 2008/0281618 A1 | 11/2008 | Mermet et al. |
| 2009/0015392 A1 | 1/2009 | Takahashi et al. |
| 2009/0037056 A1 | 2/2009 | Erb |
| 2009/0077229 A1 | 3/2009 | Ebbs |
| 2009/0217733 A1 | 9/2009 | Stachow et al. |
| 2009/0221320 A1 | 9/2009 | Walley et al. |
| 2009/0249858 A1 | 10/2009 | Ishikawa et al. |
| 2010/0039216 A1 | 2/2010 | Knight et al. |
| 2010/0039247 A1 | 2/2010 | Ziegler et al. |
| 2010/0039318 A1 | 2/2010 | Kmiecik et al. |
| 2010/0042286 A1 | 2/2010 | Lich |
| 2010/0097316 A1 | 4/2010 | Shaw et al. |
| 2010/0122246 A1 | 5/2010 | Gesquiere et al. |
| 2010/0185524 A1 | 7/2010 | Watkins et al. |
| 2010/0231002 A1 | 9/2010 | Yoshioka et al. |
| 2010/0241838 A1 | 9/2010 | Cohen et al. |
| 2010/0273422 A1 | 10/2010 | Garrett et al. |
| 2010/0279647 A1 | 11/2010 | Jacobs et al. |
| 2010/0312473 A1 | 12/2010 | Hoshizaki |
| 2010/0318257 A1 | 12/2010 | Kalinadhabhotla |
| 2011/0004444 A1 | 1/2011 | Farrow et al. |
| 2011/0029726 A1 | 2/2011 | Fujimoto |
| 2011/0060496 A1 | 3/2011 | Nielsen et al. |
| 2011/0106373 A1 | 5/2011 | Hergesheimer et al. |
| 2011/0109438 A1 | 5/2011 | Dijkstra et al. |
| 2011/0130906 A1 | 6/2011 | Mayer |
| 2011/0153367 A1 | 6/2011 | Amigo et al. |
| 2011/0202225 A1 | 8/2011 | Willis et al. |
| 2011/0202305 A1 | 8/2011 | Willis et al. |
| 2011/0218710 A1 | 9/2011 | Trinh et al. |
| 2011/0238289 A1 | 9/2011 | Lehmann et al. |
| 2011/0264393 A1 | 10/2011 | An et al. |
| 2011/0307205 A1 | 12/2011 | Vassilieff |
| 2011/0320088 A1 | 12/2011 | Eom et al. |
| 2012/0022780 A1 | 1/2012 | Kulik et al. |
| 2012/0035881 A1 | 2/2012 | Rubin et al. |
| 2012/0041618 A1 | 2/2012 | Sun et al. |
| 2012/0050095 A1 | 3/2012 | Scherzinger et al. |
| 2012/0072078 A1 | 3/2012 | Oosaki |
| 2012/0116669 A1 | 5/2012 | Lee et al. |
| 2012/0146766 A1 | 6/2012 | Geisler et al. |
| 2012/0158211 A1 | 6/2012 | Chen et al. |
| 2012/0253585 A1 | 10/2012 | Harvie |
| 2012/0253892 A1 | 10/2012 | Davidson |
| 2012/0259526 A1 | 10/2012 | Inoue et al. |
| 2012/0303203 A1 | 11/2012 | Olsen et al. |
| 2012/0331181 A1 | 12/2012 | Govande et al. |
| 2013/0002415 A1 | 1/2013 | Walli et al. |
| 2013/0013907 A1 | 1/2013 | Marino et al. |
| 2013/0024202 A1 | 1/2013 | Harris et al. |
| 2013/0030811 A1 | 1/2013 | Olleon et al. |
| 2013/0038439 A1 | 2/2013 | Saito |
| 2013/0073142 A1 | 3/2013 | Hergesheimer et al. |
| 2013/0095841 A1 | 4/2013 | Quimby et al. |
| 2013/0148554 A1 | 6/2013 | Chen |
| 2013/0182693 A1 | 7/2013 | Sperling et al. |
| 2013/0204572 A1 | 8/2013 | Sato |
| 2013/0244210 A1 | 9/2013 | Nath et al. |
| 2013/0249713 A1 | 9/2013 | Adelson |
| 2013/0275001 A1 | 10/2013 | Hergesheimer et al. |
| 2013/0288659 A1 | 10/2013 | Hrabak et al. |
| 2013/0297137 A1 | 11/2013 | Fushiki et al. |
| 2013/0302756 A1 | 11/2013 | Takeuchi et al. |
| 2013/0320654 A1 | 12/2013 | Clark et al. |
| 2013/0338855 A1 | 12/2013 | Mason et al. |
| 2014/0069837 A1 | 3/2014 | Naruishi et al. |
| 2014/0074353 A1 | 3/2014 | Lee et al. |
| 2014/0075197 A1* | 3/2014 | Alrabady ............. G06F 21/572 |
| | | 713/176 |
| 2014/0094210 A1 | 4/2014 | Gellens et al. |
| 2014/0111354 A1 | 4/2014 | Hergesheimer et al. |
| 2014/0118132 A1 | 5/2014 | Braunberger et al. |
| 2014/0142886 A1 | 5/2014 | Hergesheimer et al. |
| 2014/0143940 A1 | 5/2014 | Iuliano et al. |
| 2014/0149145 A1 | 5/2014 | Peng et al. |
| 2014/0173581 A1 | 6/2014 | Grinberg et al. |
| 2014/0180529 A1 | 6/2014 | Simon |
| 2014/0189335 A1 | 7/2014 | Liu et al. |
| 2014/0236518 A1 | 8/2014 | Hergesheimer et al. |
| 2014/0236519 A1 | 8/2014 | Hergesheimer et al. |
| 2014/0300739 A1 | 10/2014 | Mimar |
| 2014/0303836 A1 | 10/2014 | Phelan |
| 2014/0309843 A1 | 10/2014 | Chen et al. |
| 2014/0357295 A1 | 12/2014 | Skomra et al. |
| 2014/0358394 A1 | 12/2014 | Picciotti |
| 2014/0379208 A1 | 12/2014 | Mcquade et al. |
| 2015/0015385 A1 | 1/2015 | Tomita et al. |
| 2015/0051796 A1 | 2/2015 | Levy |
| 2015/0105099 A1 | 4/2015 | Luo et al. |
| 2015/0149218 A1 | 5/2015 | Bayley et al. |
| 2015/0161391 A1 | 6/2015 | Johnsen et al. |
| 2015/0248731 A1 | 9/2015 | Fernandes et al. |
| 2015/0301822 A1* | 10/2015 | Takahashi ............. G06F 13/00 |
| | | 717/173 |
| 2015/0339241 A1 | 11/2015 | Warner et al. |
| 2015/0378715 A1* | 12/2015 | Solnit .................. G06F 21/57 |
| | | 713/2 |
| 2016/0094964 A1 | 3/2016 | Barfield, Jr. et al. |
| 2016/0133130 A1 | 5/2016 | Grimm et al. |
| 2016/0146615 A1 | 5/2016 | Abhishek |
| 2016/0147523 A1 | 5/2016 | Stauffer et al. |
| 2016/0162284 A1 | 6/2016 | Meng et al. |
| 2016/0173281 A1 | 6/2016 | White et al. |
| 2016/0202966 A1* | 7/2016 | Vangelov ............... H04L 67/12 |
| | | 717/172 |
| 2016/0306624 A1* | 10/2016 | Vangelov ............... G06F 8/654 |
| 2016/0328228 A1 | 11/2016 | Baptist et al. |
| 2016/0335813 A1 | 11/2016 | Hergesheimer et al. |
| 2016/0341559 A1 | 11/2016 | Camisa |
| 2016/0362075 A1 | 12/2016 | Dlagnekov |
| 2016/0364230 A1 | 12/2016 | Moeller et al. |
| 2017/0017766 A1 | 1/2017 | Giraud |
| 2017/0023610 A1 | 1/2017 | Hergesheimer et al. |
| 2017/0220404 A1 | 8/2017 | Polar Seminario |
| 2017/0236339 A1 | 8/2017 | Camisa |
| 2017/0242678 A1* | 8/2017 | Sangameswaran ....... G06F 8/65 |
| 2017/0277530 A1 | 9/2017 | Adams et al. |
| 2017/0308705 A1* | 10/2017 | Karaginides ........... G06F 8/654 |
| 2018/0012429 A1 | 1/2018 | Jenkins et al. |
| 2018/0053354 A1 | 2/2018 | Jenkins et al. |
| 2018/0088963 A1 | 3/2018 | Arora et al. |
| 2018/0145991 A1 | 5/2018 | McCauley et al. |
| 2018/0164401 A1 | 6/2018 | Hergesheimer |
| 2019/0075377 A1 | 3/2019 | Jenkins et al. |

FOREIGN PATENT DOCUMENTS

| | | |
|---|---|---|
| EP | 2923277 A1 | 9/2015 |
| EP | 2959376 A1 | 12/2015 |
| EP | 2923277 A4 | 4/2016 |
| EP | 2959376 A4 | 1/2017 |
| EP | 2923277 B1 | 9/2017 |
| EP | 2959376 B1 | 7/2018 |
| EP | 3500453 A1 | 6/2019 |
| EP | 3500453 A4 | 4/2020 |
| GB | 2506365 A | 4/2014 |
| JP | 2007178295 A | 7/2007 |
| WO | 0218873 A2 | 3/2002 |
| WO | 2014049352 A1 | 4/2014 |
| WO | 2014130077 A1 | 8/2014 |
| WO | 2014130078 A1 | 8/2014 |
| WO | 2014202110 A1 | 12/2014 |
| WO | 2015121639 A1 | 8/2015 |
| WO | 2015183677 A1 | 12/2015 |
| WO | 2016081901 A1 | 5/2016 |
| WO | 2016191306 A1 | 12/2016 |
| WO | 2016200589 A1 | 12/2016 |
| WO | 2018009578 A1 | 1/2018 |
| WO | 2018035065 A1 | 2/2018 |

(56) References Cited

FOREIGN PATENT DOCUMENTS

OTHER PUBLICATIONS

Park et al, "Non-Invasive Rapid and Efficient Firmware Update for Wireless Sensor Networks", [Online], 2014, pp. 147-150, [ Retrieved from Internet on Nov. 5, 2019], <http://delivery.acm.org/10.1145/ 2640000/2638782/pl47-park.pdf?ip? 151.207 .250.22&id?2638782 &acc?ACTIVE%20SERVICE&kerC15944E53D0ACA63%2E> (Year: 2014).

Nilsson et al, "Secure Firmware Updates over the Air in Intelligent Vehicles", [Online], 2008, pp. 380-384, [Retrieved from Internet on Nov. 5, 2019], <https:/ /ieeexplore.ieee.org/stamp/stamp.jsp?tp? &arnumbeF4531926> (Year: 2008).

Kim et al, "Remote Progressive Firmware Update for Flash-Based Networked Embedded Systems", [Online], 2009, pp. 407-412 , [Retrieved from Internet on Nov. 5, 2019], <http://delivery.acm.org/ 10.1145/ 1600000/ 1594337 /p407-kim.pdf?ip? 151.207 .250.22 &id? 1594337&acc?ACTIVE%20SERVICE &kerC15944E53D0ACA63% 2E4> (Year: 200).

Extended European Search Report for European Application No. 13875407.2, Search completed Nov. 22, 2016, dated Nov. 30, 2016, 7 Pgs.

Extended European Search Report for European Application No. 13875911.3, Search completed Nov. 22, 2016, dated Dec. 9, 2016, 6 Pgs.

Extended European Search Report for European Application No. 17160719.5, Search completed Apr. 6, 2017, dated Apr. 18, 2017, 6 Pgs.

International Preliminary Report on Patentability for International Application PCT/US2013/054956, Report dated May 26, 2015, dated Jun. 4, 2015, 9 Pgs.

International Preliminary Report on Patentability for International Application PCT/US2013/054939, dated Aug. 25, 2015, dated Sep. 3, 2015, 4 Pgs.

International Preliminary Report on Patentability for International Application PCT/US2013/054943, dated Aug. 25, 2015, dated Sep. 3, 2015, 6 Pgs.

International Preliminary Report on Patentability for International Application PCT/US2016/033621, Report dated Nov. 28, 2017, dated Dec. 7, 2017, 7 Pgs.

International Search Report and Written Opinion for International Application No. PCT/US13/54939, Completed Feb. 5, 2014, dated Feb. 24, 2014, 5 pgs.

International Search Report and Written Opinion for International Application No. PCT/US13/54943, Completed Feb. 13, 2014, dated Feb. 27, 2014, 6 pgs.

International Search Report and Written Opinion for International Application No. PCT/US2013/054956, International Filing Date Aug. 14, 2013, Search Completed Feb. 11, 2014, dated Mar. 6, 2014, 9 pgs.

International Search Report and Written Opinion for International Application No. PCT/US2015/061990, completed Jan. 12, 2016, dated Feb. 4, 2016, 6 Pgs.

International Search Report and Written Opinion for International Application No. PCT/US2016/033621, completed Jul. 28, 2016, dated Aug. 5, 2016, 11 Pgs.

International Search Report and Written Opinion for International Application No. PCT/US2016/033625, Search completed Jul. 19, 2016, dated Aug. 18, 2016, 7 Pgs.

International Search Report and Written Opinion for International Application No. PCT/US2017 /040763, Search completed Aug. 22, 2017, dated Sep. 8, 2017, 15 Pgs.

Memsic 2125 Dual-Axis Accelerometer (#28017) Data Sheet (Parallax Inc., v2.0 Jan. 29, 2009).

"Road vehicles-Diagnostic Systems-Part 2: CARB requirements for interchange of digital information", ISO 9141-2, Feb. 1, 1994, 18 pgs.

Surface Vehicle Recommended Practice, E/E Diagnostic Test Modes, Dec. 1991, 32 pgs.

"Surface Vehicle Recommended Practice, Universal Interface for OBD II Scan", SAE Standard 12201, Issued Jun. 30, 1993, 45 pgs.

Surface Vehicle Recommended Practice; OBD II Scan Tool, Mar. 1992, 14 pgs.

ETSI, "GSM Technical Specification", GSM 07.07, Version 5.0.0, Jul. 1996, 77 pgs.

International Preliminary Report on Patentability for International Application PCT/US2016/033625, Report dated Dec. 12, 2017, dated Dec. 21, 2017, 6 Pgs.

International Preliminary Report on Patentability for International Application PCT/US2017/040763, Report dated Jan. 8, 2019, dated Jan. 17, 2019, 7 Pgs.

International Preliminary Report on Patentability for International Application PCT/US2017/046824, Report dated Feb. 19, 2019, dated Feb. 28, 2019, 9 Pgs.

International Search Report and Written Opinion for International Application No. PCT/US2017/046824, Search completed Oct. 13, 2017, dated Oct. 27, 2017, 10 Pgs.

\* cited by examiner

| Partition Type |
| --- |
| Partition Size |
| Image Type |
| Image Base Address |
| Image Size |
| Image ID |
| Header Size |
| Header Version |
| Firmware Version |
| Firmware Build Date |
| Checksum [Reserved, Image Subsection, Actual Image] |
| Header Checksum |

SYSTEMS AND METHODS FOR FAILSAFE FIRMWARE UPGRADES

CROSS-REFERENCE TO RELATED APPLICATIONS

The current application is a continuation of U.S. patent application Ser. No. 15/833,350, filed Dec. 6, 2017, entitled "Systems and Methods for Failsafe Firmware Upgrades" to Cook et al., which claims priority to U.S. Provisional Patent Application No. 62/532,834, filed Jul. 14, 2017, the disclosures of which are hereby incorporated by reference in their entireties.

FIELD OF THE INVENTION

The present invention relates to programming devices and more specifically to updating the firmware of a device.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for failsafe firmware upgrades in accordance with embodiments of the invention are disclosed. One embodiment includes a vehicle telematics device, including: a processor; and a firmware memory coupled to the processor, wherein the firmware memory comprises: a primary bootloader application, and a firmware image comprising a first segment and a second segment; wherein the primary bootloader application is configured to: verify the integrity of the first segment; verify the integrity of the second segment; select a firmware image contained in the firmware memory by using a failsafe process; and boot the vehicle telematics device by using the selected firmware image.

In a further embodiment, the firmware memory further comprises a default image and a transferred image, wherein the primary bootloader application selects the firmware image to boot the vehicle telematics device when the first segment is invalid and the second segment is invalid, and wherein the transferred image stored within the firmware memory is independent of a partition location such that transferring a single image is sufficient without the need to transfer a plurality of images, thereby saving time and cost of transferring images.

In another embodiment, the primary bootloader application verifies the integrity of the first segment by using a checksum in a first image header.

In a still further embodiment, the primary bootloader application verifies the integrity of the second segment by using a checksum in a second image header.

In a still another embodiment, the primary bootloader application selects the first segment to boot the vehicle telematics device when the first segment is valid and the second segment is invalid.

In a yet further embodiment, the primary bootloader application selects the second segment to boot the vehicle telematics device when the second segment is valid and the first segment is invalid.

In yet another embodiment, the primary bootloader application: checks an image ID for the first segment; and— checks an image ID for the second segment.

In a further embodiment again, the image ID for the first segment is located in a first image header and the image ID for the image segment is located in a second image header.

In another embodiment again, the primary bootloader application selects the first segment to boot the vehicle telematics device when the first segment is valid, the second segment is valid, and the image ID for the first segment is equal to the image ID for the second firmware image segment.

In a further additional embodiment, the primary bootloader application selects the second segment to boot the vehicle telematics device when the first segment is valid, the second segment is valid, and the image ID for the second segment is greater than the image ID for the first segment.

In another embodiment again, the firmware memory is a flash memory.

In another additional embodiment, a method for firmware updates, the method including: running a primary bootloader application contained in a firmware image by using a vehicle telematics device, wherein the vehicle telematics device comprises a processor and a firmware memory coupled to the processor and the firmware image is contained in the firmware memory, the firmware image further comprising a first segment, and a second segment; verifying the integrity of the first segment by using the vehicle telematics device; verifying the integrity of the second segment by using the vehicle telematics device; selecting a firmware image contained in the firmware memory to boot by using a failsafe process; and booting the vehicle telematics device by using the selected firmware image.

In a still yet further embodiment, the firmware memory comprises a default image and a transferred image, the method further including: selecting the default firmware image to boot the vehicle telematics device when the first segment is invalid and the second firmware image segment is invalid, wherein the transferred image stored within the firmware memory is independent of a partition location such that transferring a single image is sufficient without the need to transfer a plurality of images, thereby saving time and cost of transferring images.

In still yet another embodiment, verifying of the integrity of the first firmware image segment comprises using a checksum in a first image header by using the vehicle telematics device.

In a still further embodiment again, verifying the integrity of the second segment comprises using a checksum in a second image header by using the vehicle telematics device.

In a still further additional embodiment, the method further including selecting the first segment to boot the vehicle telematics device when the first segment is valid and the second segment is invalid.

In still another additional embodiment, the method further including: checking an image ID for the first segment by using the vehicle telematics device; and checking an image ID for the second segment by using the vehicle telematics device.

In a yet further embodiment again, the image ID for the first segment is located in a first image header and the image ID for the second segment is located in a second image header.

A yet another embodiment again includes the method further including selecting the first segment to boot the vehicle telematics device when the first firmware image segment is valid, the second firmware image segment is valid, and the image ID for the first firmware image segment is equal to the image ID for the second firmware image segment.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Figure 1:
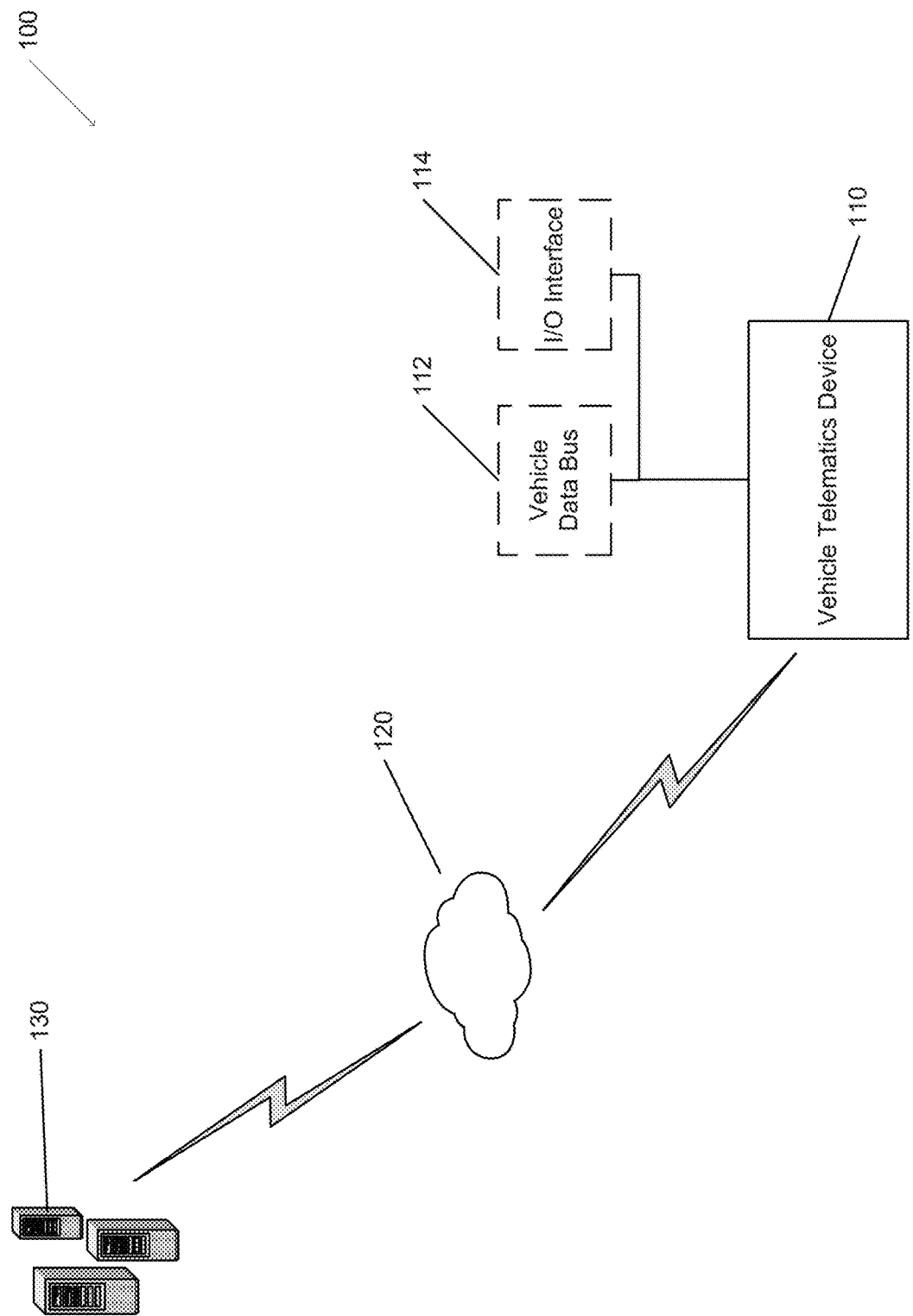
FIG. 1 is a conceptual illustration of a vehicle telematics system in accordance with an embodiment of the invention.

Turning now to the drawings, systems and methods for failsafe firmware updates in accordance with embodiments of the invention are disclosed. Many vehicles are equipped with a vehicle telematics device. Vehicle telematics devices can obtain and/or measure a variety of data regarding the conditions and/or location of the vehicle along with receiving and transmitting data to remote server systems. A variety of vehicle telematics devices can utilize firmware to control their internal operations. Firmware in a device can be upgraded for a variety of reasons including (but not limited to) fixing bugs and/or adding features to a vehicle telematics device and typically is upgraded by replacing the entire firmware image. These upgrades can be performed in a variety of ways including (but not limited to) physically replacing the memory containing a new firmware image in a vehicle telematics device and/or downloading a new firmware image to the device via wired and/or wireless connection. Updated firmware can be stored on a server and the same updated firmware image can be transmitted to many vehicle telematics devices. Firmware upgrades can present a particular challenge because interruptions occurring during the upgrade can leave many vehicle telematics devices non-functional. Failures in an upgrade can be caused by (but are not limited to) power failures and/or transmission network failures which can leave a firmware image partially updated.

In many embodiments, failsafe firmware updates can download a new firmware image to a vehicle telematics device in a way that leaves the device functional even in an event that causes the firmware update to fail. A firmware memory such as (but not limited to) flash memory can be divided into a variety of segments where each segment stores an individual firmware image. In several embodiments, firmware memory segments can include (but are not limited to) a factory default firmware image segment as well as one or more updated firmware image segments.

A factory default firmware image segment can be preinstalled on the vehicle telematics device and generally holds the primary bootloader. In many embodiments, the factory default firmware image segment is never changed for the life of the device. Factory default firmware can be utilized when updated firmware images in other segments are missing, invalid, and/or otherwise unusable. Firmware images can contain (but are not limited to) an image header, image contents, and/or a reversed space. The bootloader stored within the factory default firmware image segment can be utilized in various ways by the vehicle telematics device. The bootloader can check the validity of other image segments and identify the valid image segments. In some embodiments, the validity of a firmware image segment and/or its identification can be checked using the header within the firmware image. As discussed below, the bootloader will select a valid firmware image to load. In several embodiments, when more than one valid firmware image is available, the bootloader will select the firmware image to load such as (but not limited to) the most recent firmware image and/or a firmware image meeting any of a variety other requirements. Vehicle telematics devices utilizing failsafe firmware processes can load factory default firmware images even when updated firmware images are for some reason incompletely downloaded and/or damaged. This can prevent a device from becoming unusable from a failed firmware download. Additionally, in some embodiments, the bootloader can be used to determine where in firmware memory to store a newly downloaded firmware image. Rather than requiring the entire firmware to be rewritten as part of an update, many embodiments of the invention allow an updated firmware image to be stored in any partition (e.g. firmware segment) in the firmware memory. Utilizing an updated firmware image can be independent of the number of firmware image segments stored in the firmware memory. As an illustrative example, failsafe firmware updates can transfer one firmware image segment to update a portion of the firmware which, in various embodiments, can save time and costs associated with transferring and/or writing the data as compared to the prior art which requires transmitting an entire firmware image. In several embodiments, multiple updated firmware image segments can be transferred to vehicle telematics devices and stored in various segments (or partitions) of firmware memory.

In a variety of embodiments, the operational state of a vehicle is utilized to determine if a vehicle telematics device should transmit and/or receive data and/or apply a firmware update. In a number of embodiments, vehicle ignition state (e.g. the operational status of the vehicle) is ascertained by monitoring the vehicle for signs indicative of the vehicle ignition state without directly connecting to the vehicle ignition line. Information indicative of vehicle ignition state (e.g. vehicle status data) can be ascertained by observing characteristics of the vehicle including but not limited to the power supplied by the vehicle, vehicle vibration, communications on an OBD II or other vehicle data bus line, and/or vehicle position information. In many embodiments, multiple different types of information are combined to ascertain the vehicle ignition state. Systems and methods for using an asset tracking device added to the vehicle after the manufacture of the vehicle without a direct connection to the vehicle ignition line that can be utilized to determine ignition state information in accordance with embodiments of the invention are described in U.S. Pat. No. 8,489,271, titled "Systems and Methods for Virtual Ignition Detection" and issued Jul. 16, 2013, the disclosure of which is hereby incorporated by reference in its entirety.

Systems and methods for failsafe firmware updates in accordance with embodiments of the invention are discussed below.

Vehicle Telematics Systems

Vehicle telematics systems in accordance with embodiments of the invention can transmit a variety of data between a remote server system and a vehicle telematics device, including firmware updates. A conceptual diagram of a vehicle telematics system in accordance with an embodiment of the invention is shown in FIG. 1. The vehicle telematics system 100 includes a vehicle telematics device 110 that can communicate with a vehicle data bus 112, and/or an input/output (I/O) interface 114 as appropriate to the requirements of specific applications of embodiments of the invention. In a variety of embodiments, the vehicle telematics device 110 communicates with the remote server system 130 via a network 120. In a variety of embodiments, the network 120 is the Internet. In many embodiments, the network 120 is any wired or wireless network, such as a cellular network, between the vehicle telematics device 110 and/or the mobile communications device and the remote server system 130. In a number of embodiments, the remote server system 130 implemented using a single server system. In several embodiments, the remote server system 130 is implemented using multiple server systems.

In a variety of embodiments, the vehicle telematics device 110 is installed in a vehicle having a vehicle data bus 112. In several embodiments, the vehicle telematics device 110 is connected to a vehicle diagnostic connector that provides access to the vehicle data bus 112. The vehicle telematics device 110 can obtain data from any of a variety of vehicle devices connected to the vehicle data bus 112 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with embodiments of the invention are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device is connected directly, either wired or wirelessly, to one or more sensors within the vehicle and/or does not utilize the vehicle data bus 112.

The vehicle telematics device 110 can include any of a variety of sensors and/or devices, including those described above with respect to the vehicle data bus and any described in more detail below, to obtain data regarding the status of the vehicle. The vehicle telematics device 110 can also communicate with any of a variety of sensors and/or devices using the I/O interface 114. The I/O interface 114 can be any connection, including wired and wireless connections, as appropriate to the requirements of specific applications of embodiments of the invention. In several embodiments, the vehicle telematics device 110 is capable of executing scripts to read data and/or perform particular processes. These scripts can be pre-loaded on the device and/or obtained from the remote server system 130, vehicle data bus 112, and/or the I/O interface 114 as appropriate to the requirements of specific applications of embodiments of the invention. The vehicle telematics device 110 can be self-powered and/or connected into the electrical system of the vehicle in which the vehicle telematics device 110 is installed. In a variety of embodiments, the vehicle telematics device is powered via the vehicle data bus 112 and/or the I/O interface 114. In many embodiments, the vehicle telematics device 110 utilizes a Global Positioning System (GPS) receiver in order to determine the location, speed, and/or acceleration of the vehicle.

In a variety of embodiments, the vehicle telematics device 110 and/or remote server system 130 provides a user interface allowing for visualizing and interacting with the data transmitted and/or received between the systems. In several embodiments, the vehicle telematics device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle telematics system in accordance with embodiments of the invention are discussed above and illustrated in FIG. 1, a variety of architectures, including sensors and other devices and techniques not specifically described above, can be utilized in accordance with embodiments of the invention. Furthermore, the processes described herein can be performed using any combination the vehicle telematics device, mobile communications device, and/or the remote server systems as appropriate to the requirements of specific applications of embodiments of the invention.

Vehicle Telematics Devices

Figure 2:
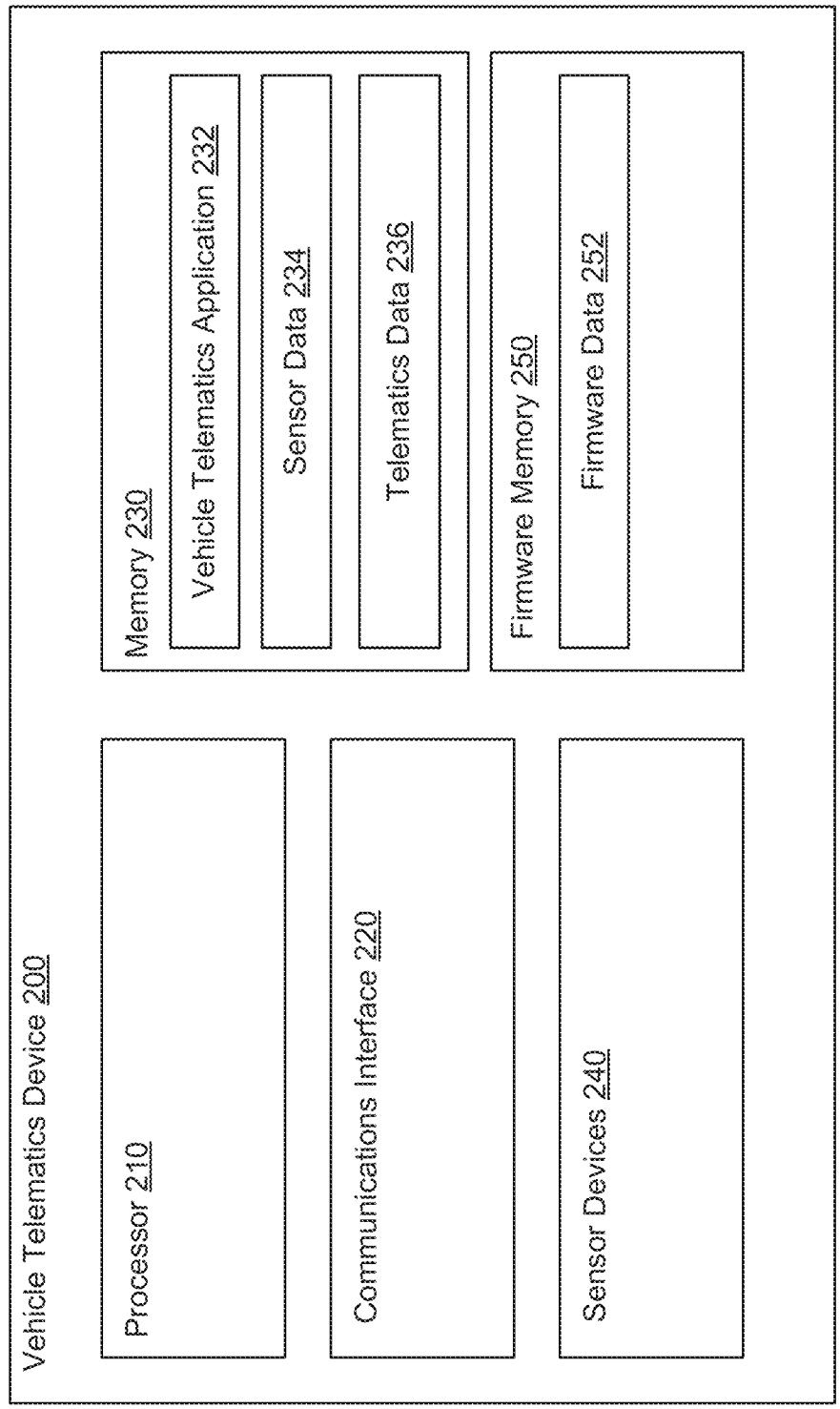
FIG. 2 is a conceptual illustration of a vehicle telematics device in accordance with an embodiment of the invention.

Vehicle telematics devices in accordance with embodiments of the invention can transmit and receive data. A conceptual illustration of a vehicle telematics device in accordance with an embodiment of the invention is shown in FIG. 2. The vehicle telematics device 200 includes a processor 210 in communication with memory 230 and/or firmware memory 250. The vehicle telematics device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, and telematics data 236. In many embodiments, the vehicle telematics application 232, sensor data 234, and/or telematics data 236 are stored using an external server system and received by the vehicle telematics device 200 using the communications interface 220. Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of embodiments of the invention. Sensor devices 240 can be included within the vehicle telematics device 200 and/or located external to the vehicle telematics device 200. The vehicle telematics 200 can communicate with external sensor devices using the communications interface 220, such as via a vehicle data bus, I/O interface (including serial interfaces), mobile communications device, and/or a network connection as appropriate to the requirements of specific applications of embodiments of the invention. In a variety of embodiments, a vehicle telematics device is connected to a diagnostic connector (e.g. an OBD II port) in a vehicle.

In various embodiments, the firmware memory 250 is any form of storage configured to store a variety of data including (but not limited to) firmware data 252 which can include one or more firmware image segments including a factory default firmware image segment as well as one or more optional failsafe firmware image segments. It should be readily apparent that firmware memory 250 is merely illustrative and firmware memory can be stored in a variety of locations within a vehicle telematics device including (but not limited to) as part of a single memory within the device, as a separate firmware memory, and/or firmware image segments divided between several memories. As an illustrative example, a divided firmware memory can include a factory default firmware image segment in one memory and one or more additional firmware image segments in one or more additional memories.

The processor 210 can be directed, by the vehicle telematics application 232, to perform a variety of failsafe update processes; a number of which that can be performed in accordance with embodiments of the invention are described in more detail below.

Although specific architectures for vehicle telematics devices in accordance with embodiments of the invention are conceptually illustrated in FIG. 2, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Firmware Images

Figure 3:
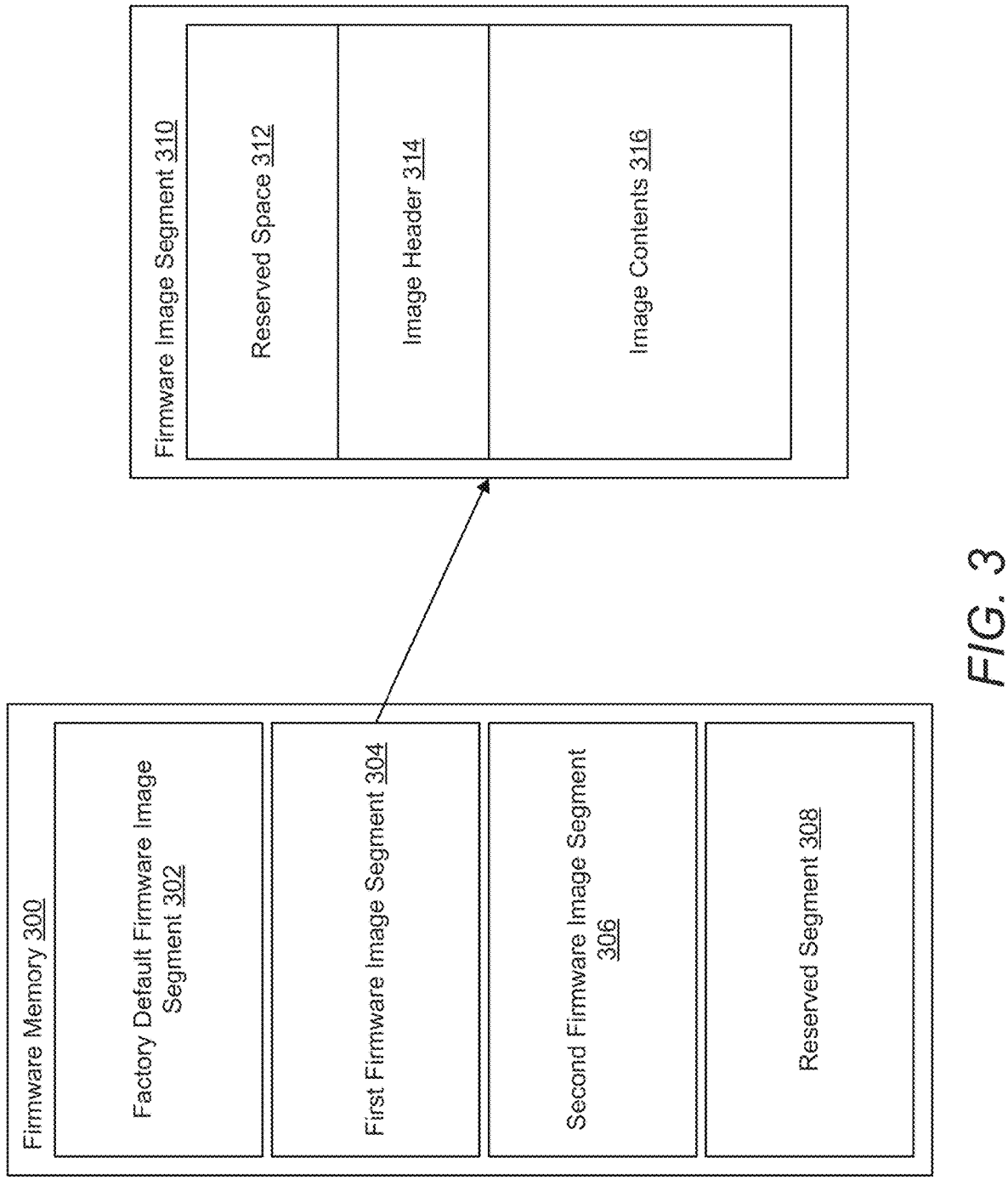
FIG. 3 is a conceptual illustration of firmware memory segments in accordance with an embodiment of the invention.

Firmware memory in accordance with embodiments of the invention can contain one or more firmware image segments. A conceptual illustration of firmware memory which can be utilized in a vehicle telematics device in accordance with a variety of embodiments of the invention is illustrated in FIG. 3. The firmware memory 300 includes a variety of firmware image segments. Firmware memory can include factory default firmware image segment 302 (e.g. firmware image and/or default image), first firmware image segment 304 (e.g. first segment), second firmware image segment 304 (e.g. second segment), and/or reserved segment 308. A factory default firmware image segment 302 can include a preset firmware image loaded onto the device that is not updated during the life of the vehicle telematics device. Vehicle telematics devices can be booted from a factory default firmware image even when one or more other firmware images are inoperable for any of a variety of circumstances, such as (but not limited to) by an interrupted image download. In several embodiments, a primary bootloader application can be contained within factory default firmware image. First firmware image segment 304 and/or second firmware image segment 306 can hold updated firmware images (e.g. transferred images) downloaded by vehicle telematics devices. Reserved segment 308 can be used to store (but is not limited to) vehicle telematics device hardware specific information and/or additional firmware image segments.

Firmware image segment 310 is an example of one organization of a firmware image segment, but it should be readily appreciated by one having ordinary skill in the art that any firmware image segment containing these areas and/or firmware image segments can be organized in different ways as appropriate to the requirements of several embodiments of the invention. Firmware image segment 310 can store (but is not limited to) reserved space 312, image header 314, and/or image contents 316. Reserved space 312 can store (but is not limited to) vehicle telematics device hardware specific information. Image header 314 can store a variety of fields including fields which can be utilized to (but is not limited to) identify the segment partition type, check the validity of the image stored within a partition, and/or identify a version of a firmware image. Image contents 316 can store firmware image data.

Figure 4:
FIG. 4 is a conceptual illustration of firmware header image fields in accordance with an embodiment of the invention.

Turning now to FIG. 4, the structure of a firmware header image in accordance with an embodiment of the invention is illustrated. Image header fields 400 include a variety of fields which one having ordinary skill in the art can appreciate are merely exemplary. Fields can include (but are not limited to) partition type, partition size, image type, image base address, image size, image ID, header size, header version, firmware version, firmware build date, checksum (for reserved, image subsection and/or actual image), and/or header checksum.

In many embodiments, the partition type can identify if a firmware image segment is factory default, first, or second. Partition size can identify the size of a segment in number of bytes. In many embodiments, partition size can be larger than the actual image size. The image type can be used to identify whether the information in the segment holds the firmware image or another type of reserved images unrelated to firmware updates. Image base address generally is the start address of a segment which is unique to each of the factory default firmware image segment, the first firmware image segment, and the second firmware image segment. Image ID can be used to identify the most recently updated segment. In various embodiments, image ID can be a numerical value but it should be readily apparent to one having ordinary skill that any value which can determine a newer version from an older version can be utilized as appropriate.

Header size can hold the actual size of the header information in bytes. Header version can contain a variety of information and optionally can be reserved for future use. Firmware version can contain the revision of firmware in an image segment. In several embodiments, build date can contain the date and time when a firmware image was built. Checksum fields can contain the checksum of reserves spaces, the image contents of the firmware image, and/or the actual image. The header checksum can contain a checksum for the image header itself. In many embodiments, checksums can be computed using a variety of hashing algorithms, such as but not limited to MD5, SHA-0, SHA-1, SHA-2, SHA-3 RIPEMD, RIPEMD-128, RIPEMD-160, BLAKE, and BLAKE2. In an illustrative example, a checksum generated using a MD5 hashing algorithm can generate a 16 byte hash of the area in which the checksum in computed. In many embodiments, the integrity of a firmware image segment can be verified using the checksums of individual components in an image partition including (but not limited to) the header checksum.

Although specific partitions for firmware memory and firmware image header fields in accordance with embodiments of the invention are conceptually illustrated in FIGS. 3 and 4, any of a variety of firmware memory partition schemes to store multiple firmware images can be utilized as appropriate to various embodiments of the invention. Additionally, firmware memory can contain any number of firmware image segments as appropriate to the requirements of specific applications of embodiments of the invention.

Booting Vehicle Telematics Devices

Figure 5:
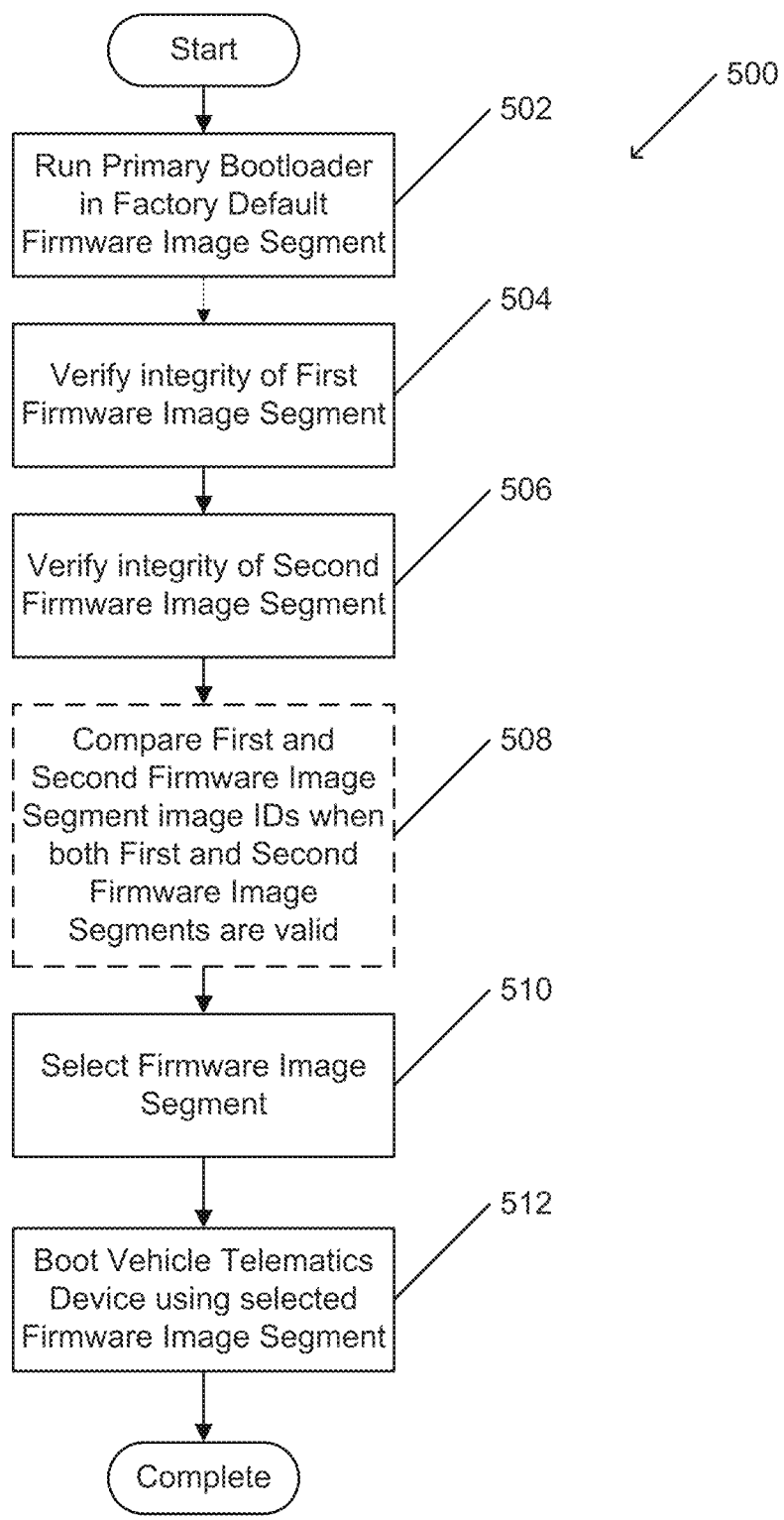
FIG. 5 is a flowchart illustrating a process for failsafe firmware upgrades in accordance with an embodiment of the invention.

Failsafe firmware processes can load firmware images stored in a vehicle telematics device. Turning now to FIG. 5, a process for selecting a firmware image to load from a partitioned firmware memory in accordance with an embodiment of the invention is shown. The process 500 includes running (502) a primary bootloader located in a factory default image segment (e.g. a firmware image and/or a default firmware image). The integrity of first firmware image segment (e.g. first segment) can be verified (504). In several embodiments, this verification can occur by checking a field in the first firmware image segment header. In several embodiments, verification of an image segment can be performed by using the checksums of individual components in an image partition including (but not limited to) the header checksum. In some embodiments, an image segment can be VALID or INVALID. It should be obvious to one having ordinary skill in the art that checking header values within a firmware image for verification are merely exemplary and any of a variety of verification approaches can be utilized as appropriate to the requirements of various embodiments of the invention. The integrity of second firmware image segment (e.g. second segment) can be verified (506). This verification can also be performed (but is not limited to) by checking a field in a firmware header file such as (but not limited to) a header checksum.

First and second firmware image segment image IDs can optionally be compared (508). This comparison can occur when both firmware images stored in first and second image segments are VALID, and can check to see which is the most recent firmware image. In many embodiment, image ID can be compared by checking values in a firmware header field such as an image ID. Image ID header filed can contain a numerical value but it should be readily apparent to one having ordinary skill in the art that this field value is not limited to a number and can contain any value which can differentiate firmware versions.

A firmware image segment is selected (510) to boot the vehicle telematics device. If both the first firmware image and the second firmware image are INVALID, then the factory default firmware image can be chosen. If the first firmware image segment contains a VALID firmware image, but the second firmware image segment is INVALID, the first firmware image can be chosen. When the opposite is true and the second firmware image segment contains a VALID image and the first firmware image segment is INVALID, the second firmware image segment can be chosen.

When both the first and second firmware image segments are VALID, the optionally compared image IDs can be used to determine which image segment to select. In some embodiments, selecting a greater (and/or equal) valued image ID can select the newer firmware image. As an illustrative example, if the first image ID is equal to the second image ID, the first firmware image segment can be selected. Furthermore, if the second image ID is greater than the first image ID, the second firmware image segment can be selected. The selected firmware version can be selected to boot (512) the vehicle telematics device. It should be readily apparent to one having ordinary skill that selecting to boot the vehicle telematics device using newer firmware images is merely illustrative and any of a variety of metrics can be utilized to select valid firmware images to boot the vehicle telematics device such as (but not limited to) selecting a particular firmware image on certain dates and/or selecting a particular firmware image based on particular hardware in the vehicle telematics device Furthermore, a vehicle telematics device can receive a message instructing the device to switch to a particular firmware image and reboot the device to boot that particular firmware image.

Additionally, the first firmware image and the second firmware image can have different structures. Firmware image structures can be tailored to specific applications and firmware images can be selected to boot based on their structure. In some embodiments, multiple updated firmware images for different segments can be downloaded to a vehicle telematics device at the same time. As an illustrative example, the same firmware image can be downloaded for more than one segment as a backup in case an image becomes damaged in some way.

Although a variety of failsafe firmware update processes in accordance with embodiments of the invention are illustrated in FIG. 5, any of a variety of processes for updating firmware in a vehicle telematics device can be utilized in accordance with embodiments of the invention.

Updating Firmware Images

Figure 6:
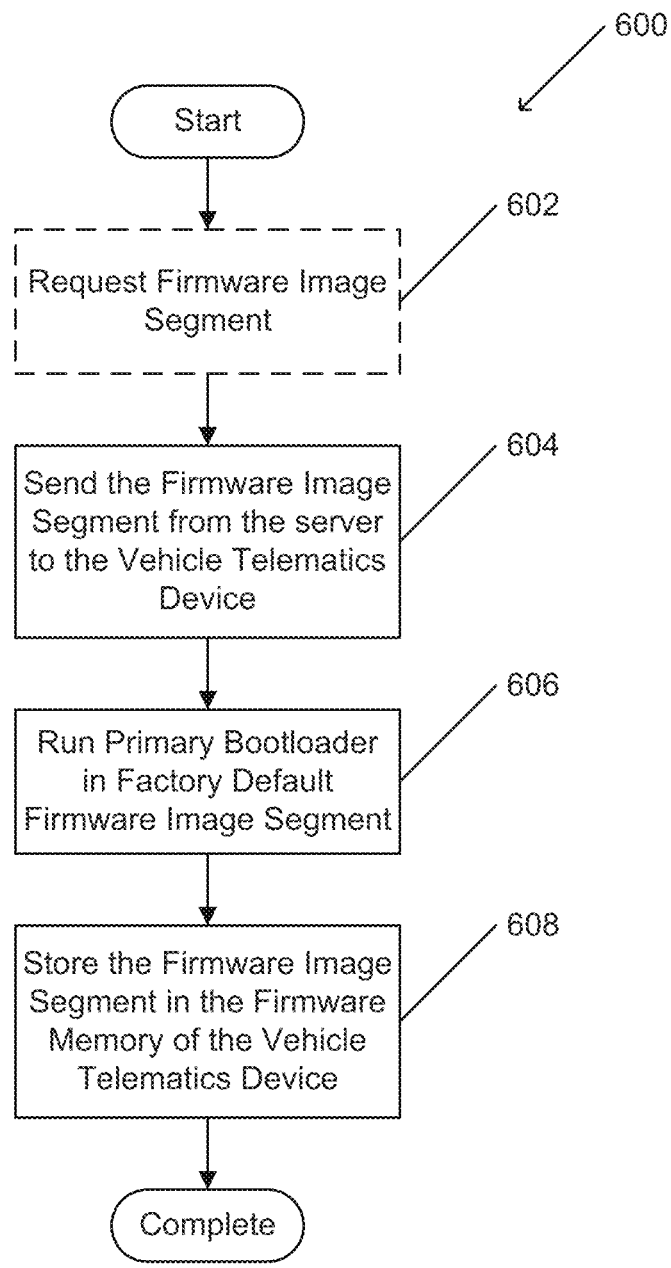
FIG. 6 is a flowchart illustrating a process for updating and storing a failsafe firmware image in firmware memory of a vehicle telematics device in accordance with an embodiment of the invention.

Turing now to FIG. 6, a process for updating and storing a failsafe firmware image in firmware memory in accordance with an embodiment of the invention is shown. The process 600 includes optionally requesting (602) a firmware image segment. This request can be sent to a server where copies of firmware images are stored and/or a computing system which coordinates the synchronization of firmware image updates to vehicle telematics devices. A firmware image segment can be sent (604) to the vehicle telematics device.

The primary bootloader stored in the factory default firmware image segment (e.g. a firmware image and/or a default image) can run (606) to coordinate storing the received firmware image segment. The received firmware image segment can be stored (608) in the firmware memory of the vehicle telematics device. In many embodiments, the received firmware image segment can be stored in an empty memory location and/or replace a firmware image segment stored in a memory location. In various embodiments, a received firmware image segment can be stored in a memory location that is not currently selected by the primary bootloader application (e.g. a standby location). In some embodiments, the received firmware image segment contains metadata, such as in the firmware segment header data that identifies the firmware image segment in which the firmware should be stored.

Although a variety of failsafe firmware update and storage processes in accordance with embodiments of the invention re illustrated in FIG. 6, any of a variety of processes for updating and storing firmware in memory of a vehicle telematics device can be utilized in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device, comprising:
   a processor; and
   a firmware memory coupled to the processor and partitioned into a plurality of segments, wherein the plurality of segments comprises:
      a first firmware image segment including a primary bootloader application, wherein the first firmware image segment comprises a first firmware image, wherein the first firmware image comprises an image header that includes a partition type, and wherein the partition type is indicative of a default firmware image segment; and
      a second firmware image segment;
   wherein the vehicle telematics device is configured to:
      receive an updated firmware image; and
      run the primary bootloader application from the first firmware image segment; and
   wherein the primary bootloader application is configured to:
      store the updated firmware image in the second firmware image segment of the firmware memory, wherein the updated firmware image comprises metadata that identifies the second firmware image segment in which the updated firmware image is to be stored;
      compare a first image ID of the image header of the first firmware image to a second image ID of the updated firmware image in response to storage of the updated firmware image; and
      select the updated firmware image to boot the vehicle telematics device when the second image ID is greater than the first image ID in response to a comparison of the first image ID to the second image ID.

2. The vehicle telematics device of claim 1, wherein the updated firmware image comprises an image header, and wherein the image header comprises the metadata.

3. The vehicle telematics device of claim 1, wherein the second firmware image segment comprises an image header that includes an image ID for the second firmware image segment.

4. The vehicle telematics device of claim 1, wherein:
   the vehicle telematics device is further to request the updated firmware image from a remote server; and
   to receive the updated firmware image comprises to receive the updated firmware image from the remote server.

5. The vehicle telematics device of claim 1, wherein to store the updated firmware image comprises to replace a firmware image stored in the second firmware image segment.

6. The vehicle telematics device of claim 1, wherein the second firmware image segment comprises a standby location of the firmware memory.

7. The vehicle telematics device of claim 1, wherein the firmware memory comprises a flash memory.

8. A method for firmware updates, the method comprising:
   running, by a vehicle telematics device, a primary bootloader application from a first firmware segment, wherein the vehicle telematics device comprises a processor and a firmware memory coupled to the processor, the firmware memory partitioned into a plurality of segments, and wherein the plurality of segments comprises the first firmware image segment including the primary bootloader application, and a second firmware image segment;
   receiving, by the vehicle telematics device, an updated firmware image; and
   storing, by the primary bootloader application, the updated firmware image in the second firmware image segment of the firmware memory, wherein the updated firmware image comprises metadata that identifies the second firmware image segment in which the updated firmware image is to be stored;
   wherein the first firmware image segment comprises a first firmware image, wherein the first firmware image comprises an image header that includes a partition type, and wherein the partition type is indicative of a default firmware image segment; and
   the method further comprising comparing a first image ID of the image header of the first firmware image to a second image ID of the updated firmware image in response to storing the updated firmware image; and
   selecting the updated firmware image to boot the vehicle telematics device when the second image ID is greater than the first image ID in response to comparing the first image ID to the second image ID.

9. The method of claim 8, wherein the updated firmware image comprises an image header, and wherein the image header comprises the metadata.

10. The method of claim 8, further comprising:
requesting, by vehicle telematics device, the updated firmware image from a remote server;
wherein receiving the updated firmware image comprises receiving the updated firmware image from the remote server.

11. The method of claim 8, wherein storing the updated firmware image comprises replacing a firmware image stored in the second firmware image segment.

12. The method of claim 8, wherein the second firmware image segment comprises a standby location of the firmware memory.

13. The method of claim 8, wherein the firmware memory comprises a flash memory.

* * * * *